United States Patent  
Sun et al.

(10) Patent No.: US 12,317,101 B2  
(45) Date of Patent: May 27, 2025

(54) CAWN SYSTEM AND WORKING METHOD THEREOF

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Junshuai Sun, Beijing (CN); Guangyi Liu, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 567 days.

(21) Appl. No.: 17/755,438

(22) PCT Filed: Oct. 15, 2020

(86) PCT No.: PCT/CN2020/121165  
§ 371 (c)(1),  
(2) Date: Apr. 28, 2022

(87) PCT Pub. No.: WO2021/088614  
PCT Pub. Date: May 14, 2021

(65) Prior Publication Data  
US 2022/0386149 A1 Dec. 1, 2022

(30) Foreign Application Priority Data  
Nov. 6, 2019 (CN) .......................... 201911075681.7

(51) Int. Cl.  
H04W 24/02 (2009.01)  
H04W 84/02 (2009.01)

(52) U.S. Cl.  
CPC ............ *H04W 24/02* (2013.01); *H04W 84/02* (2013.01)

(58) Field of Classification Search  
CPC ..... H04W 24/02; H04W 84/02; H04W 24/10; H04W 84/042  
See application file for complete search history.

(56) References Cited

U.S. PATENT DOCUMENTS

2011/0085471 A1* 4/2011 Zhang ................... H04W 16/00  
370/254  
2015/0281073 A1 10/2015 Kotha et al.  
(Continued)

FOREIGN PATENT DOCUMENTS

CN 101296481 A 10/2008  
CN 103857004 A 6/2014  
(Continued)

OTHER PUBLICATIONS

NGMN Alliance. "5G End-to-End Architecture Framework(V3.0.8)" Aug. 28, 2019 (Aug. 28, 2019), sections 6.4 and 12.4.  
(Continued)

*Primary Examiner* — Khoa Huynh  
(74) *Attorney, Agent, or Firm* — Syncoda LLC; Feng Ma

(57) ABSTRACT

A CAWN system includes: a centralized data unit for collecting and processing data of a network-side high-layer functional entity, a transmission network functional entity and/or a network-side low-layer functional entity, and generating a control command; the network-side high-layer functional entity for generating, under the control of the centralized data unit, a function of the high-layer functional entity according to measured user information, cell infor-  
(Continued)

mation, and information of a locally running device; the transmission network functional entity for generating, under the control of the centralized data unit, a function of the transmission network functional entity according to the measured user information, cell information, and information of the locally running device; and the network-side low-layer functional entity for generating, under the control of the centralized data unit, a function of the low-layer functional entity according to the measured user information, cell information, and information of the locally running device.

15 Claims, 6 Drawing Sheets

(56) References Cited

U.S. PATENT DOCUMENTS

| | | | |
|---|---|---|---|
| 2016/0173535 | A1 | 6/2016 | Barabash et al. |
| 2016/0330752 | A1* | 11/2016 | Kato ............... H04W 48/16 |
| 2018/0302918 | A1 | 10/2018 | Shaheen |
| 2019/0053260 | A1 | 2/2019 | Shaheen |
| 2019/0072638 | A1 | 3/2019 | Wang et al. |
| 2019/0208448 | A1* | 7/2019 | Peng ............... H04W 36/0085 |

FOREIGN PATENT DOCUMENTS

| | | |
|---|---|---|
| CN | 103945559 A | 7/2014 |
| CN | 104750464 A | 7/2015 |
| CN | 104919758 A | 9/2015 |
| CN | 106792739 A | 5/2017 |
| CN | 107592329 A | 1/2018 |
| CN | 109076642 A | 12/2018 |
| KR | 20130075455 A | 7/2013 |

OTHER PUBLICATIONS

3GPP. "Extended Reality (XR) in 5G" 3GPP TR 26.928 V1.1.0, Oct. 31, 2019 (Oct. 31, 2019), entire document.

International Search Report in the international application No. PCT/CN2020/121165, mailed on Jan. 15, 2021.

English translation of the Written Opinion of the International Search Authority in the international application No. PCT/CN2020/121165, mailed on Jan. 15, 2021.

Hui Liu et al. "Research on Mobile Network Architecture Evolution and Related Key Technologies" «CNKI Network Technology», Dec. 5, 2015.

Hucheng Wang et al. "Current Research and Development Trend of 5G Network Technologies" Sep. 20, 2015.

Hannan Bin Liaqat, Feng Xia, etc. "Social-Similarity-Aware TCP With Collision Avoidance in Ad Hoc Social Networks" «IEEE Systems Journal ( vol. 9, Issue: 4, Dec. 2015)» Mar. 11, 2014.

3GPP "Summary of Rel-15 Work Items", 3GPP TR 21.915 V1.1.0, Mar. 20, 2019.

* cited by examiner

CAWN SYSTEM AND WORKING METHOD THEREOF

CROSS-REFERENCE TO RELATED APPLICATIONS

This application is a National Stage of International Application No. PCT/CN2020/121165 filed on Oct. 15, 2020, which claims priority to Chinese Patent Application No. 201911075681.7 filed on Nov. 6, 2019. The disclosures of these applications are hereby incorporated by reference in their entirety.

TECHNICAL FIELD

The disclosure relates to the technical field of wireless communications, and in particular to a Context-Aware Wireless Network (CAWN) system and an operating method thereof.

BACKGROUND

The current 4G/5G network architecture is mainly mobility-oriented network architecture, including a centralized Core Network (CN), decentralized base stations, and user mobility management mechanisms of two levels, i.e., the CN and the base station. In the current 5G system, the network architecture is still the traditional architecture of CN plus base station, but service types and scenarios envisaged to be supported by 5G have been far beyond the traditional mobile communication scenarios. In the era of 4G and 5G, the mobile communication is still faced with traditional mobile communication scenarios, such as call and data service, so an evolved architecture based on the traditional network architecture currently defined in the 5G standards can support the requirements of the current communication scenarios. Based on the service types and scenarios envisaged to be supported by 5G, the next generation mobile communication puts forward a wider range of requirements that have a profound impact on society. Driven by these requirements, the traditional network architecture can no longer support these requirements, and a redesign of the system is required.

SUMMARY

The technical problem to be solved to the disclosure is to provide a CAWN system and an operating method thereof, which can meet the requirements of the next generation mobile communication.

To solve the above technical problem, a technical solution provided by embodiments of the disclosure is implemented as follows.

The embodiments of the disclosure provide a CAWN system, which may include: a Central Data Unit (CDU), a High Layer of Network Side (HL), a Transport Network (TN), and a Lower Layer of Network Side (LL).

The CDU is configured to collect and process data of the HL, the TN and/or the LL, and generate a command for controlling the HL, the TN and/or the LL.

The HL is configured to generate, under the control of the CDU, a function of the high-layer functional entity according to measured user information, cell information and information of a locally running device.

The TN is configured to generate, under the control of the CDU, a function of the TN according to the measured user information, cell information and information of the locally running device.

The LL is configured to generate, under the control of the CDU, a function of the low-layer functional entity according to the measured user information, cell information and information of the locally running device.

Optionally, the CDU is further configured to control a self-generating and self-consistent capability of the HL, the TN and/or the LL.

Optionally, the HL includes a Network Autonomous Control of High Layer (NAC-H) and a Control Plane and User Plane of High Layer (CP-H/UP-H). The NAC-H is configured to generate, under the control of the CDU, an autonomous control command for the CP-H/UP-H according to a parameter generated by the CP-H/UP-H.

Optionally, the TN includes a transmission network self-consistent control functional entity and a transmission network layer functional entity. The transmission network self-consistent control functional entity is configured to generate, under the control of the CDU, a transmission channel supporting data transmission of the HL and the LL according to a parameter generated by the transmission network layer functional entity.

Optionally, the LL includes a Network Autonomous Control of Low Layer (NAC-L) and a Control Plane and User Plane of Low Layer (CP-L/UP-L). The NAC-L is configured to complete, under the control of the CDU, the control and transmission of air interface data according to a parameter generated by the CP-L/UP-L.

Optionally, the CDU is specifically configured to collect data information of the HL, the TN and/or the LL, calculate the collected data, and perform at least one of the following operations:

determining an operating state of a device and a user;
identifying a service type of the user and generating a QoS guarantee control command for a service;
identifying the type of an air interface cell, and generating a control command for the cell;
identifying an operating state of the device; and
generating a control command for the connection and cooperation of the device.

Optionally, the collected data information includes at least one of the following:

measurement information about the operation of each user and device by the HL, the TN and/or the LL;
information about sending and receiving data at an air interface;
information about inter-cell Handover (HO) of the user; and
power information of the user.

Optionally, the HL is specifically configured to report an operating state of the HL and user information beared by the HL to the CDU.

The TN is specifically configured to report an operating state of the TN and user information beared by the TN to the CDU.

The LL is specifically configured to report an operating state of the LL and user information beared by the LL to the CDU.

The CDU is configured to determine, according to the received data information, that the service of a user needs to be deployed near the air interface, and send a command of separately deploying a data plane function to the HL. The command carries a performance calculation result of the CDU for the deployment of a data plane function of the service near the air interface.

The HL is further configured to develop a separation scheme of a secondary data plane function after receiving the command, report the separation scheme to the CDU, and send configuration information to the LL.

The LL is further configured to configure according to the received configuration information.

The CDU is further configured to send a bandwidth adjustment command to the TN.

The TN is further configured to adjust, after receiving the bandwidth adjustment command, a transmission bandwidth of the service according to the bandwidth adjustment command.

Optionally, the CDU is specifically configured to send an HO command to the HL after predicting that a terminal will perform HO. The HO command carries the HO time and a target LL.

The HL is specifically configured to determine the target LL after receiving the HO command, acknowledge sending and receiving of a data packet that has been sent after receiving a formal HO request from a source LL, establish the secondary data plane function on the target LL, and start to send data after the secondary data plane function is established successfully.

The CDU is further configured to send a bandwidth adjustment command to the TN.

The TN is further configured to reallocate, after receiving the bandwidth adjustment command, the transmission bandwidth used by a source secondary data plane function or a target secondary data plane function according to the bandwidth adjustment command.

The HL is further configured to instruct the source LL to release the secondary data plane function after the secondary data plane function on the target LL is established successfully.

The embodiments of the disclosure provide an operating method of a CAWN system, which is applied to the above CAWN system and may include the following operations.

The data of the HL, the TN and/or the LL is collected and processed through the CDU, and the command for controlling the HL, the TN and/or the LL is generated.

The HL is controlled, through the CDU, to generate a function of the high-layer functional entity according to the measured user information, cell information and information of the locally running device.

The TN is controlled, through the CDU, to generate a function of the TN according to the measured user information, cell information and information of the locally running device.

The LL is controlled, through the CDU, to generate a function of the low-layer functional entity according to the measured user information, cell information and information of the locally running device.

Optionally, the method may specifically include the following operations.

The HL reports an operating state of the HL and user information beared by the HL to the CDU.

The TN reports an operating state of the TN and user information beared by the TN to the CDU.

The LL reports an operating state of the LL and user information beared by the LL to the CDU.

The CDU determines, according to the received data information, that the service of a user needs to be deployed near an air interface, and sends the command of separately deploying the data plane to the HL. The command carries the performance calculation result of the CDU for the deployment of the data plane function of the service near the air interface.

After receiving the command, the HL develops the separation scheme of the secondary data plane function, reports the separation scheme to the CDU, and sends the configuration information to the LL.

The LL configures according to the received configuration information.

The CDU sends the bandwidth adjustment command to the TN.

After receiving the bandwidth adjustment command, the TN adjusts the transmission bandwidth of the service according to the bandwidth adjustment command.

Optionally, the method may specifically include the following operations.

After predicting that the terminal will perform HO, the CDU sends the HO command to the HL. The HO command carries the HO time and the target LL.

The HL determines the target LL after receiving the HO command, acknowledges sending and receiving of a data packet that has been sent after receiving the formal HO request from the source LL, establishes the secondary data plane function on the target LL, and starts to send data after the secondary data plane function is established successfully.

The CDU sends the bandwidth adjustment command to the TN.

After receiving the bandwidth adjustment command, the TN reallocates the transmission bandwidth used by the source secondary data plane function or the target secondary data plane function according to the bandwidth adjustment command.

The HL instructs the source LL to release the secondary data plane function after the secondary data plane function on the target LL is established successfully.

The embodiments of the disclosure provide a communication device, which may include: a memory, a processor and a computer program which is stored on the memory and capable of running on the processor. The computer program, when executed by the processor, implements the steps in the above operating method of a CAWN system.

The embodiments of the disclosure provide a computer-readable storage medium, in which a computer program is stored. The computer program, when executed by the processor, implements the steps in the above operating method of a CAWN system.

The embodiments of the disclosure have the following beneficial effects.

In the above solution, the CDU can collect and process the data of the HL, the TN and/or the LL, and generate the command for controlling the HL, the TN and/or the LL. In this way, the CDU can perform big data computing for users, summarize user characteristics, form the accurate determination and control of behaviors of a type of users, and customize a control and data receiving and transmitting scheme for each user, so as to meet the requirements of the next generation mobile communication.

BRIEF DESCRIPTION OF THE DRAWINGS

In order to more clearly illustrate technical solutions in embodiments of the application, the drawings needed in the descriptions of the embodiments are simply introduced below. It is apparent that the accompanying drawings in the following description are only some embodiments of the application, for the ordinary skill in the art, some other accompanying drawings can also be obtained according to these on the premise of not contributing creative effort.

DETAILED DESCRIPTION

Figure 1:
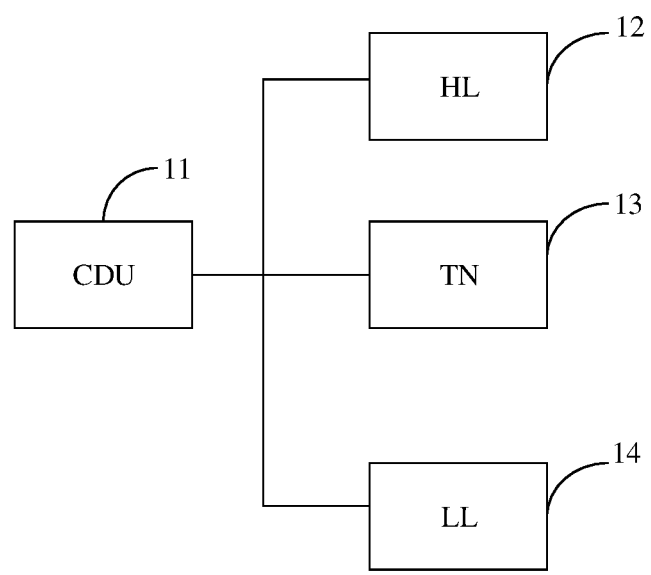
FIG. 1 is an architecture diagram of a CAWN system according to an embodiment of the disclosure.

For making the technical problem, technical solutions and advantages of the embodiments of the disclosure clearer, a detailed description is given below in combination with the accompanying drawings and the specific embodiments.

Exemplary embodiments of the disclosure will be described in more detail with reference to the drawings. Although the exemplary embodiments of the disclosure are shown in the drawings, it should be understood that the disclosure may be implemented in various forms and shall not be limited by the embodiments described here. Rather, these embodiments are provided in order to have a more thorough understanding of the disclosure and to be able to fully convey the scope of the disclosure to those skilled in the art.

Terms "first", "second" and the like in the specification and claims of the application are used to distinguish similar objects and do not have to describe a specific sequence or order. It should be understood that the objects may be exchanged under appropriate circumstances, so that the embodiments of the present application described here may be implemented in an order different from that described or shown here. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead. "And/or" in the specification and the claims represents at least one of connected objects.

The technologies described herein are not limited to a Long Term Evolution (LTE)/LTE-Advanced (LTE-A) system, and may also be applied to various wireless communication systems, for example, Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and other systems. Terms "system" and "network" are usually used interchangeably. The CDMA system may implement radio technologies such as CDMA2000 and Universal Terrestrial Radio Access (UTRA). UTRA includes Wideband CDMA (WCDMA) and other CDMA variations. The TDMA system may implement radio technologies such as Global System for Mobile Communication (GSM). The OFDMA system may implement radio technologies such as Ultra Mobile Broadband (UMB), Evolution-UTRA (E-UTRA), Institute of Electrical and Electronics Engineers (IEEE) 802.11 (Wireless Fidelity (Wi-Fi)), IEEE 802.16 (World Interoperability for Microwave Access (WiMAX)), IEEE 802.20, and Flash-OFDM. UTRA and E-UTRA are part of Universal Mobile Telecommunications System (UMTS). LTE and more advanced LTE (such as LTE-A) are new UMTS releases using E-UTRA. UTRA, E-UTRA, UMTS, LTE, LTE-A and GSM are described in the documents from the organization named after "3rd Generation Partnership Project (3GPP)". CDMA2000 and UMB are described in the documents from the organization named after "3GPP2". The technologies described herein may be applied not only to the above-mentioned systems and radio technologies but also to other systems and radio technologies. However, a New Radio (NR) system is described below as an example, and NR terms are used in most of the following descriptions although these technologies may also be applied to systems except the NR system.

The following descriptions are exemplary and not intended to limit the scope, applicability or configuration described in the claims. Functions and arrangements of discussed elements may be changed without departing from the spirit and scope of the disclosure. Various procedures or components may be omitted, replaced or added appropriately in each example. For example, the described method may be executed in sequences different from that described here, and various steps may be added, omitted or combined. In addition, features described with reference to some examples may be combined in other examples.

Taking the International Organization for Standardization (ISO) seven-layer model as an example, L1 and/or part of L2 is a low layer, all or part of L2 and L3 are high layers. Taking the current 5G network architecture as an example, Media Access Control (MAC) and a Physical Layer (PHY) are low layers, and Radio Link Control (RLC), Packet Data Convergence Protocol (PDCP), Service Data Adaptation Protocol (SDAP), Radio Resource Control (RRC) and Authentication Management Function (AMF) of the CN, a UPF and a Session Management Function (SMF) are high layers.

The concept of native AI is widely mentioned. An AI tool is used to optimize wireless resources in wireless networks. The next generation wireless network faces more complex application scenarios. If the AI tool can be used to better serve users, user experience can be greatly improved.

The design objective of a lite network for the next generation mobile communication requires researches on the wireless network driven by the AI tool.

For the problem that the traditional network architecture cannot support service types and scenarios envisaged to be supported by 5G, in faced with the requirements of the next generation mobile communications, a network needs to be aware of each user it serves, and can perform big data computing to the user, summarize user characteristics, form the accurate determination and control of behaviors of a type of users, and customize a control and data receiving and transmitting scheme for each user. The network is called a Context-aware Wireless Network (CAWN). In the CAWN, the network needs to be aware of everything about a terminal, including a location, a service, an operating state of the terminal itself, a control requirement, a moving state, potential behaviors and so on, and the terminal reports various measurements so that the network side can fully learn its state. The terminal is a "dumb terminal", which does not undertake any complex computation to save power consumption and applies the computing power to the computation of a user-specific application layer, and the network side provides the terminal with all control and data transmission schemes in the wireless field.

An embodiment of the disclosure provides a CAWN system and an operating method thereof, which can meet the requirements of the next generation mobile communication.

As shown in FIG. 1, the CAWN system according to an embodiment of the disclosure may include: a Central Data Unit (CDU) 11, a High Layer of Network Side (HL) 12, a Transport Network (TN) 13, and a Lower Layer of Network Side (LL) 14.

The CDU 11 is configured to collect and process data of the HL, the TN and/or the LL, and generate a command for controlling the HL, the TN and/or the LL.

The HL 12 is configured to generate, under control of the CDU, a function of the high-layer functional entity according to measured user information, cell information and information of a locally running device.

The TN 13 is configured to generate, under control of the CDU, a function of the TN according to the measured user information, cell information and information of the locally running device.

The LL 14 is configured to generate, under control of the CDU, a function of the low-layer functional entity according to the measured user information, cell information and information of the locally running device.

In the present embodiment, the CDU can collect and process the data of the HL, the TN and/or the LL, and generate the command for controlling the HL, the TN and/or the LL. In this way, the CDU can perform big data computing for users, summarize user characteristics, form the accurate determination and control of behaviors of a type of users, and customize a control and data receiving and transmitting scheme for each user, so as to meet the requirements of the next generation mobile communication.

The HL 12 refers to hardware, software, firmware, middleware, microcode or a combination thereof that can generate a high-layer function under the control of the CDU according to the measured user information, cell information and information of the locally running device. The TN 13 refers to hardware, software, firmware, middleware, microcode or a combination thereof that can generate a transmission network function under the control of the CDU according to the measured user information, cell information and information of the locally running device. The LL refers to hardware, software, firmware, middleware, microcode or a combination thereof that can generate a low-layer function under the control of the CDU according to the measured user information, cell information and information of the locally running device.

Optionally, the CDU 11 is further configured to control a self-generating and self-consistent capability of the HL, the TN and/or the LL. According to the current general explanation, self-consistent simply means that if it deduces according to its own logic, it can prove that it is not contradictory or wrong at least, this is simple self-consistency. Following the self-consistency, a scientific research is established on an objective basis; on the contrary, it is established on a subjective basis, and the final attribution cannot be falsifiable or verifiable. A theory or method that cannot meet the self-consistency will obviously collapse of itself. Based on the above definition, the self-generating and self-consistent capability of the HL, the TN and/or the LL refers to that the HL, the TN and/or the LL may deploy or control a network self-generating function or schedule resources according to one of the requirements, such as the service load supported by the network, the number of users, user service request and the quality of coverage of the air interface.

Optionally, the HL 12 includes a Network Autonomous Control of High Layer (NAC-H), and a Control Plane and User Plane of High Layer (CP-H/UP-H). The NAC-H is configured to generate, under the control of the CDU, an autonomous control command for the CP-H/UP-H according to the parameter generated by the CP-H/UP-H.

Optionally, the TN 13 includes a transmission network self-consistent control functional entity and a transmission network layer functional entity. The transmission network self-consistent control functional entity is configured to generate, under the control of the CDU, a transmission channel supporting data transmission of the HL and the LL according to a parameter generated by the transmission network layer functional entity.

Optionally, the LL 14 includes the NAC-L and the CP-L/UP-L. The NAC-L is configured to complete, under the control of the CDU, the control and transmission of air interface data according to a parameter generated by the CP-L/UP-L.

Optionally, the CDU 11 is specifically configured to collect data information of the HL 12, the TN 13 and/or the LL 14, calculate the collected data, and perform at least one of the following operations:
  determining an operating state of a device or user;
  identifying a service type of the user and generating a QoS guarantee control command for a service;
  identifying the type of an air interface cell, and generating a control command for the cell;
  identifying an operating state of a device; and
  generating a control command for the connection and cooperation of devices.

Optionally, the collected data information includes at least one of the following:
  measurement information about the operation of each user and device by the HL 12, the TN 13 and/or the LL 14;
  information about sending and receiving data at an air interface;
  information about inter-cell HO of the user; and
  power information of the user.

In a specific embodiment, the HL 12 is specifically configured to report its own operating state and user information beared by the HL to the CDU.

The TN 13 is specifically configured to report its own operating state and user information beared by the HL to the CDU.

The LL 14 is specifically configured to report its own operating state and user information beared by the HL to the CDU.

The CDU 11 is configured to determine, according to the received data information, that the service of a user needs to be deployed near the air interface, and send a command of separately deploying a data plane function to the HL 12. The command carries a performance calculation result of the CDU for the deployment of a data plane function of the service near the air interface.

The HL 12 is further configured to develop a separation scheme of a secondary data plane function after receiving the command, report the separation scheme to the CDU, and send configuration information to the LL.

The LL 14 is further configured to perform configuration according to the received configuration information.

The CDU 11 is further configured to send a bandwidth adjustment command to the TN 13.

The TN 13 is further configured to adjust, after receiving the bandwidth adjustment command, a transmission bandwidth of the service according to the bandwidth adjustment command.

In another specific embodiment, the CDU 11 is specifically configured to send an HO command to the HL after predicting that a terminal will perform HO. The HO command carries the HO time and a target LL.

The HL 12 is specifically configured to determine the target LL after receiving the HO command, acknowledge sending and receiving of a data packet that has been sent after receiving a formal HO request from a source LL, establish the secondary data plane function on the target LL, and start to send data after the secondary data plane function is established successfully.

The CDU 11 is further configured to send a bandwidth adjustment command to the TN 13.

The TN 13 is further configured to reallocate, after receiving the bandwidth adjustment command, the transmission bandwidth used by a source secondary data plane function or a target secondary data plane function according to the bandwidth adjustment command.

The HL 12 is further configured to instruct the source LL to release the secondary data plane function after the secondary data plane function on the target LL is established successfully.

In a specific example, the data plane function may be the UPF.

The CAWN system of the disclosure is further introduced below in combination with the accompanying drawings and the specific embodiments.

The characteristics of the CAWN system are as follows.

1. A centralized big data processing center provides a unified analysis of user behavior and network operating state, and centrally controls a CN, a Transport Network (TN) and a Radio Access Network (RAN).

2. Each network functional entity has the self-generating and self-consistent capability.

3. The network is multi-layered, and has flexible coupling between layers (different from the current strict CN+RAN+TN division architecture), and functions of the layers are defined away from or near the air interface according to the actual needs of the user. The purpose of defining the layers is to realize better mobility management for the user.

The core idea of the CAWN is that the traditional division of user control function and data processing function between the CN and the RAN is removed, the corresponding function is flexibly defined according to a user location, and billing or other management functions of operators are not flexibly defined. The flexible definition of these functions is coarsely adjusted and controlled in large scale through a centralized big data computing control point, and then each functional entity is precisely controlled in small scale. The combination of the two achieves precise control.

Figure 2:
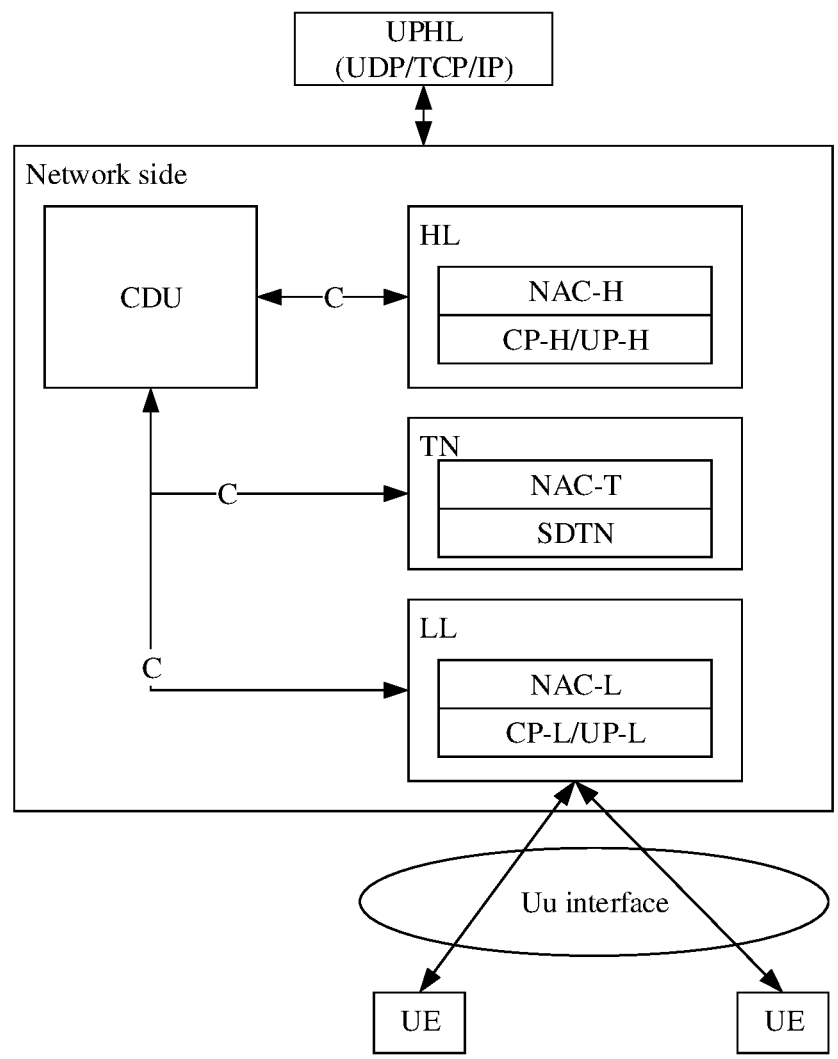
FIG. 2 is a schematic diagram of network functions of a CAWN according to an embodiment of the disclosure.

The function of the CAWN is shown in FIG. 2. The CAWN controls and coordinates a transmission network part serving the wireless communication, a layer 3 high-layer protocol part and a low-layer protocol part (air interface protocol part, such as layer 1/layer 2) as a whole. The CAWN consists of the CDU, the HL, the TN and the LL. UP of High Layer (UPHL (UDP/TCP/IP)) is connected to the network side at outside of the network side.

The UPHL is mainly layer 3 and layers above layer 3, including the UDP/TCP and IP layer, and mainly focuses on the data processing function of the user. The UDP/TCP/IP represents an upper protocol layer of the protocol layer included in the CAWN, and takes charge of distributing a data packet between different entities of the CAWN network side.

The CAWN includes the CDU and the HL.

The CDU is the central data unit, which takes charge of collecting and processing data of the CAWN, generates a command for controlling the HL, the TN and the LL of the network side, and controls the self-generating and self-consistent capability of the HL, the TN and the LL.

The HL is the high-layer functional entity of the CAWN, which is the function of layer 3 and part of layer 2 (the functional entities of protocol sub-layers such as UPF, AMF, SDAP, PDCP and RRC), and is mainly composed of two logical functional entities, that is, the NAC-H and the CP-H/UP-H. The main function of the NAC-H is to generate self-consistent control for the CP-H/UP-H under the unified control of the CDU according to various parameters generated by the CP-H/UP-H, including interaction with the TN and low layer, function control, etc.

The TN is the transmission network functional entity of the CAWN, which is mainly composed of two logical functional entities, that is, Network Autonomous Control of Transport Network (NAC-T) and Soft Defined Transport Network (SDTN). The main function of the NAC-T is to generate various transmission channels supporting data transmission of the HL and LL and QoS guarantee capability under the unified control of the CDU according to various parameters generated by the SDTN.

The LL is the low-layer functional entity of the CAWN, which is the function of part of layer 2 and layer 1, and is mainly composed of two logical functional entities, that is, Network Autonomous Control of Lower Layer (NAC-L) and Control Plane and User Plane of Lower Layer (CP-L/UP-L). The main function of the NAC-L is to complete the control and transmission of air interface data under the unified control of the CDU according to various parameters generated by the CP-L/UP-L.

The HL and the LL are communication protocol functions of the CAWN, and the TN is the transmission network of the CAWN. The three functional entities complete their respective self-consistent functions under the control of the CDU.

The CDU is a centralized control point of the network, which collects, through an interface (e.g. the C interface defined in FIG. 2), the measurement information about the operation of each user and device by the HL, the TN and the LL, the information about sending and receiving data at an air interface, the information about inter-cell HO of the user, the power information of the user and other information. The CDU calculates the collected data, determines the operating state of the device and the user, identifies the service type of the user and generates a QoS guarantee control command for the service, identifies the type of the air interface cell and generates a control command for the cell, identifies the operating state of the device, and generates a control command for the connection and cooperation of devices.

Under the unified control of the CDU, the HL, the LL, and the TN generate a local control command according to the information of the locally running device, the cell information, the user information and other measurement parameters. For example, according to the command of the CDU for user distribution, the TN generates a transmission bandwidth configuration and a route configuration that meet the requirement for user transmission, and the HL and the LL generate a corresponding function configuration. The HL and the LL generate air interface control signaling for a User Equipment (UE) step by step. The HL and the LL complete a coordination and control function of the multi-layered network. For example, the CDU instructs the HL to start a new Access Point (AP) device, and the HL instructs the AP device to activate the air interface cell, so that a user context is established, and the connection control between the AP and the HL is completed.

Figure 3:
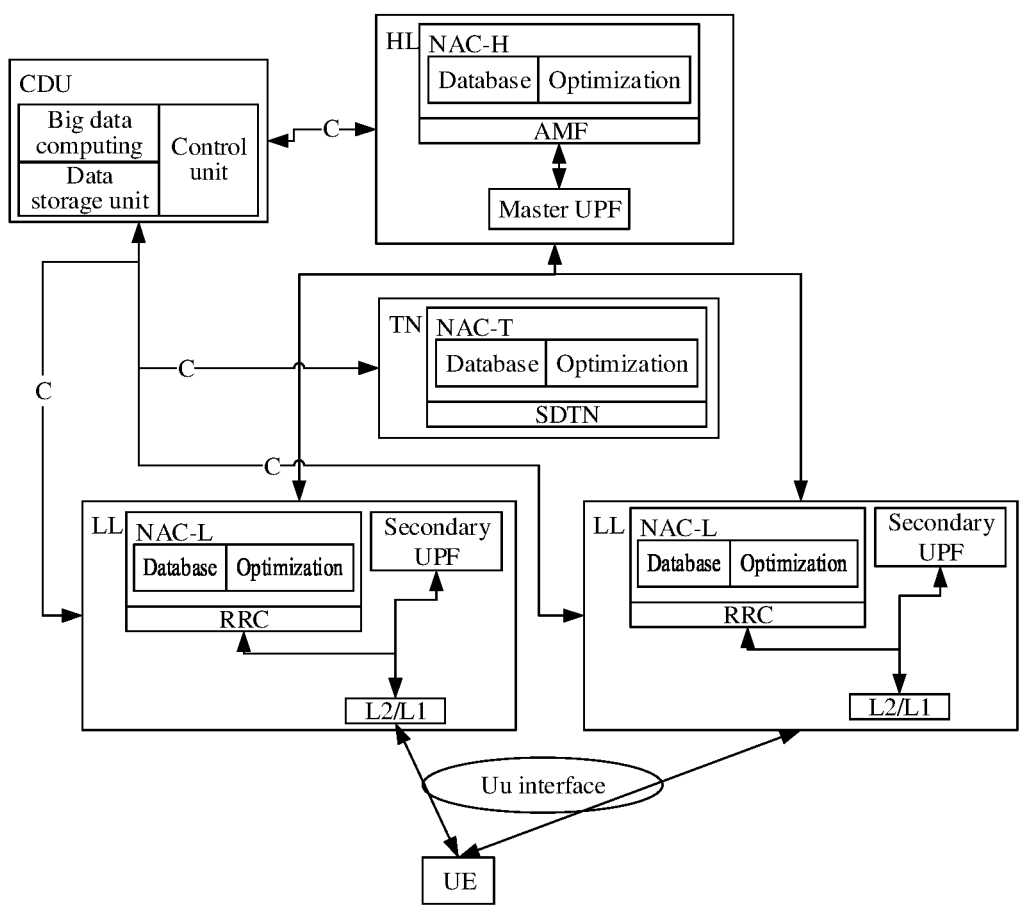
FIG. 3 is a schematic diagram of a flexible aware CAWN function instance at a data plane of high layer according to an embodiment of the disclosure.

In an embodiment, FIG. 3 shows a schematic diagram of function-aware coupling among the HL, the TN and the LL under the control of the CDU, and gives a description of functions when the user moves.

The CDU performs big data computing based on the data stored in its own data storage unit (such as a database used as data storage), and the control command is generated by a controlling unit based on the computing result. For example, the CDU instructs the HL to deploy separately the UPF of the user to deploy a secondary UPF to the LL near the air interface, and gives a control relationship between a master UPF and the secondary UPF. When the user moves, the control command is generated to complete data interaction among the master UPF, a source secondary UPF and a target secondary UPF.

Figure 4:
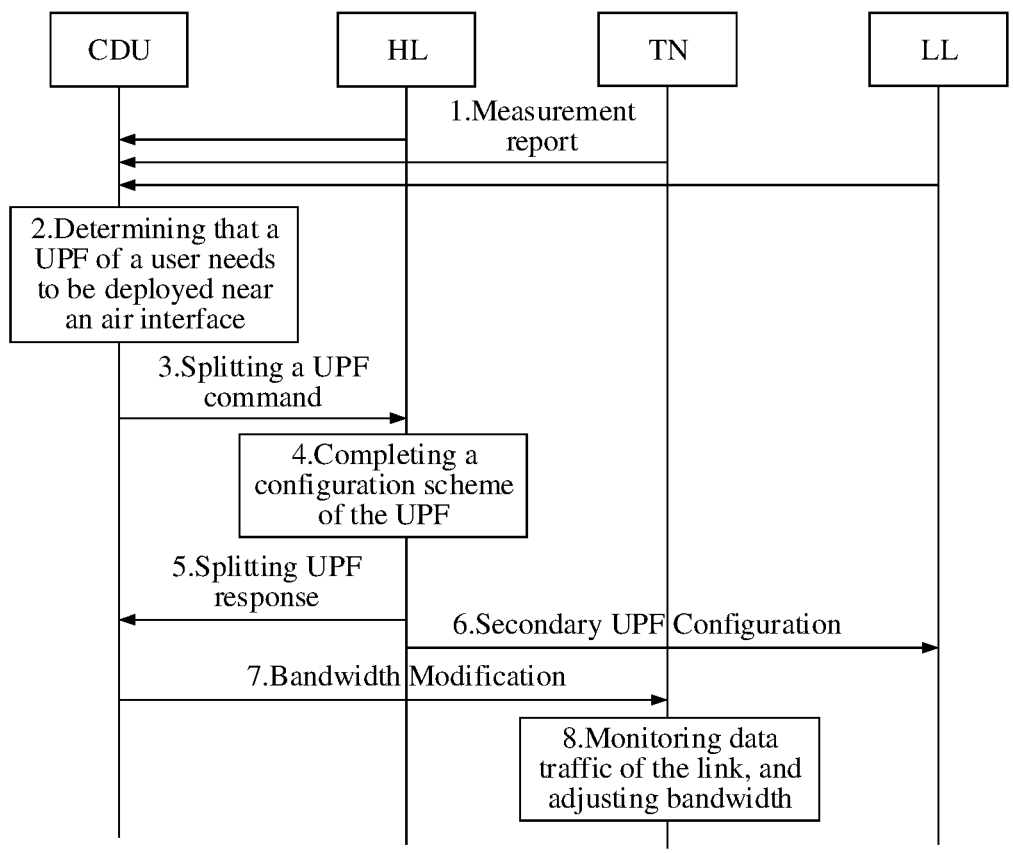
FIG. 4 is a flowchart of establishing a secondary User Plane Function (UPF) according to an embodiment of the disclosure.

FIG. 4 shows a process of establishing the secondary UPF. As shown in FIG. 4, the process includes the following steps.

At Step 1, the HL, the TN and the LL report measurement to the CDU respectively, that is, report their respective running state and the beared user information, including the number of users, the throughput, etc.

At Step 2, the CDU determines, according to its own big data computing capability, that a service of a certain user has a large amount of data to be transmitted or has a requirement on the QoS such as delay, and if the UPF is not deployed near the air interface, more burden is put on the system, or the requirement on the QoS cannot be met, so the UPF needs to be deployed near the air interface.

At Step 3, the CDU sends a command of separately deploying the UPF to the HL. The command carries a performance calculation result given by the CDU in the case that the UPF of a service of the user is deployed near the air interface, for example, a possible data volume for guaranteeing the secondary UPF, the minimum threshold of the data volume in the cache, and a distribution rule of a time period in which the separated deployment may need to be maintained.

At Step 4, after receiving the command from the CDU, the HL develops the corresponding separation scheme of the secondary UPF according to the locally measured information for the service of the user, including the amount of cached data, a method for acknowledging data feedback, a method for acknowledging the success of data transmission, etc.

At Step 5, the HL reports the separation scheme to the CDU.

At Step 6, the HL configures the LL and establishes the secondary UPF. After receiving the command, the LL saves the configuration information, sets the required cache, and sets the required hardware and software capabilities, such as the memory and transmission of an operating system.

At Step 7, the CDU informs the TN to adjust the bandwidth of the transmission network of the user.

At Step 8, after receiving the command, the TN increases or decreases the configuration according to the locally measured transmission bandwidth information for the service of the user.

After the secondary UPF is established successfully, a packet acknowledgment mechanism is established between the master UPF and the secondary UPF. The master UPF caches locally the data sent to the secondary UPF each time.

After the data is sent to the secondary UPF successfully, the secondary UPF sends an acknowledgment, which includes the information of the data packet successfully sent this time. After receiving the acknowledgment, the master UPF discards the data that has been sent successfully.

When a master UPF has multiple secondary UPFs, the master UPF needs to have a traffic control function, and distributes the data packets according to the rate at which each data packet for the secondary UPF is sent and a delay between two data packets.

B) Handover of the secondary UPFs

Figure 5:
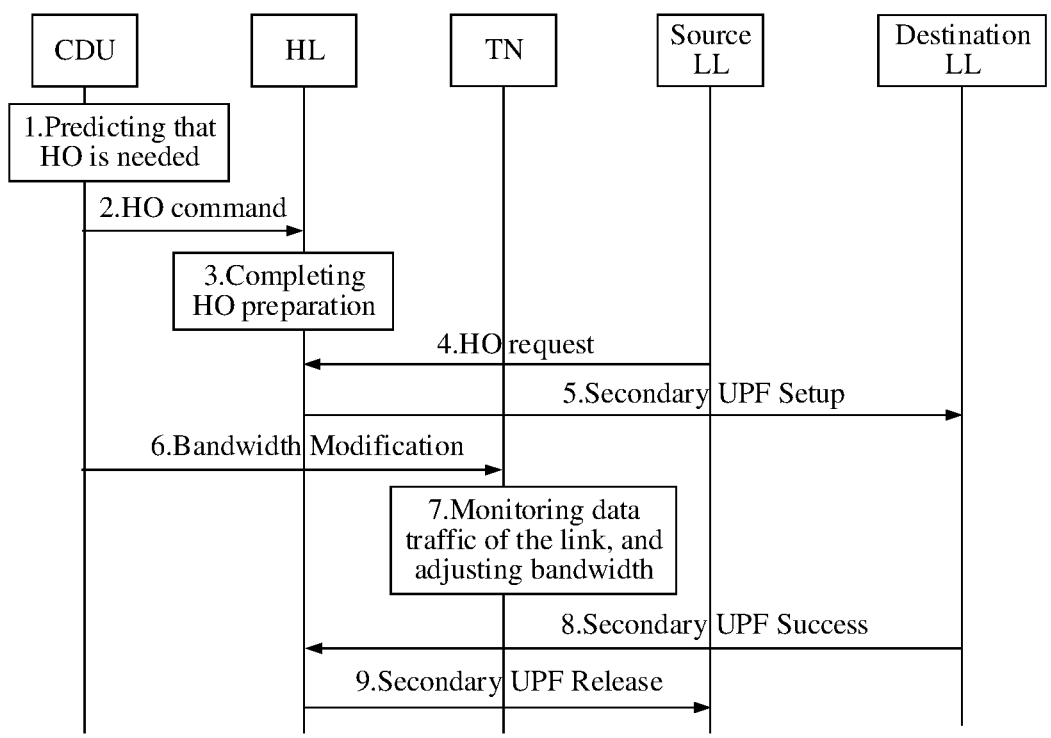
FIG. 5 is a flowchart of HO of a secondary UPF according to an embodiment of the disclosure.

FIG. 5 shows a process of HO of the secondary UPFs. As shown in FIG. 5, the process includes the following steps.

At Step 1, the CDU predicts that the UE will perform HO according to the measurement and corresponding data computing.

At Step 2, the CDU sends an HO command to the HL. The HO command carries a determination for the point in time at which the HO occurs and the possible target LL.

At Step 3, the HL prepares for the HO after receiving the command, including traffic monitoring of the data sent to the source LL, acknowledgment statistics of receiving and sending data, and the determination of the target LL according to the local measurement information.

At Step 4, the HL receives the formal HO request sent by the source LL. After receiving the formal HO request, the HL acknowledges receiving of the sent data packet.

At Step 5, the HL establishes the secondary UPF on the target LL. After establishing the secondary UPF successfully, the HL starts to send data, including the data that has not been acknowledged on the source secondary UPF, the data that has not been sent successfully, and new data received.

At Step 6, the CDU sends the bandwidth adjustment command to the TN.

At Step 7, the TN reallocates the transmission bandwidth used by the source secondary UPF or the target secondary UPF according to the local measurement.

At Step 8, the secondary UPF on the target LL is established successfully.

At Step 9, the HL commands the source LL to release the secondary UPF.

In the present embodiment, the secondary UPF is directly deployed instead of the current signaling configuration mode in 4G/5G. When the AMF of the HL generates the secondary UPF, a secondary UPF is cloned directly according to the master UPF, which means that the data receiving and sending state and the user context information in the secondary UPF are completely the same as the state of the master UPF at the moment of cloning, the HL sends the cloned secondary UPF to the LL, and the LL provides the UPF with software and hardware resources for operating, including caches, operating system resources, process or thread definitions, etc. The secondary UPF can be configured in a manner of container or docker in the Information Technology (IT).

Figure 6:
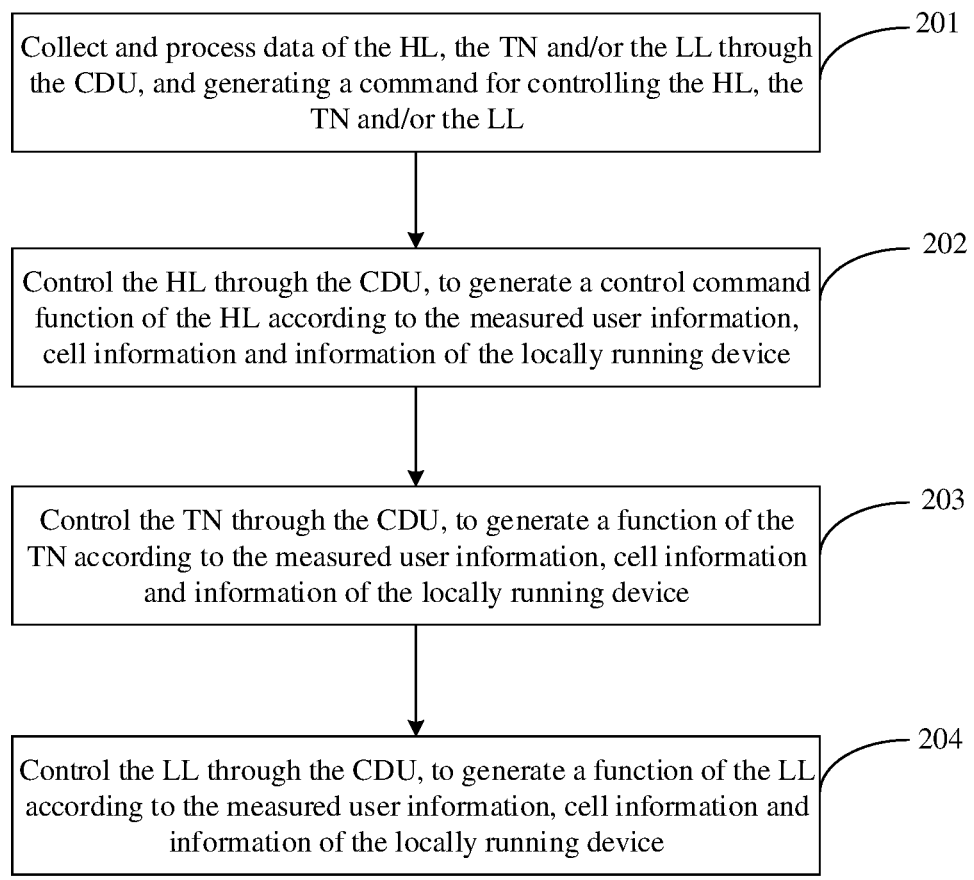
FIG. 6 is a flowchart of an operating method of a CAWN system according to an embodiment of the disclosure.

An embodiment of the disclosure provides an operating method of a CAWN system, which is applied to the above CAWN system, and may include the following steps, as shown in FIG. 6.

At S201, the data of the HL, the TN and/or the LL is collected and processed through the CDU, and the command for controlling the HL, the TN and/or the LL is generated.

At S202, the HL is controlled, through the CDU, to generate a function of the high-layer functional entity according to the measured user information, cell information and information of the locally running device.

At S203, the TN is controlled, through the CDU, to generate a function of the TN according to the measured user information, cell information and information of the locally running device.

At S204, the LL is controlled, through the CDU, to generate a function of the low-layer functional entity according to the measured user information, cell information and information of the locally running device.

In the present embodiment, the CDU can collect and process the data of the HL, the TN and/or the LL, and generate the command for controlling the HL, the TN and/or the LL. In this way, the CDU can perform big data computing for users, summarize user characteristics, form the accurate determination and control of behaviors of a type of users, and customize a control and data receiving and transmitting scheme for each user, so as to meet the requirements of the next generation mobile communication.

In a specific embodiment, the method may specifically include the following operations.

The HL reports an operating state of the HL and user information beared by the HL to the CDU.

The TN reports an operating state of the TN and user information beared by the TN to the CDU.

The LL reports an operating state of the LL and user information beared by the LL to the CDU.

The CDU determines, according to the received data information, that the service of a user needs to be deployed near an air interface, and sends the command of separately deploying the data plane to the HL. The command carries the performance calculation result of the CDU for the deployment of the data plane function of the service near the air interface.

After receiving the command, the HL develops the separation scheme of the secondary data plane function, reports the separation scheme to the CDU, and sends the configuration information to the LL.

The LL configures according to the received configuration information.

The CDU sends the bandwidth adjustment command to the TN.

After receiving the bandwidth adjustment command, the TN adjusts the transmission bandwidth of the service according to the bandwidth adjustment command.

In another specific embodiment, the method may specifically include the following operations.

After predicting that the terminal will perform HO, the CDU sends the HO command to the HL. The HO command carries the HO time and the target LL.

The HL determines the target LL after receiving the HO command, acknowledging sending and receiving of the data packet that has been sent after receiving the formal HO request from the source LL, establishes the secondary data plane function on the target LL, and starts to send data after the secondary data plane function is established successfully.

The CDU sends the bandwidth adjustment command to the TN.

After receiving the bandwidth adjustment command, the TN reallocates the transmission bandwidth used by the source secondary data plane function or the target secondary data plane function according to the bandwidth adjustment command.

The HL instructs the source LL to release the secondary data plane function after the secondary data plane function on the target LL is established successfully.

The embodiments of the disclosure provide a communication device, which may include: a memory, a processor and a computer program which is stored on the memory and capable of running on the processor. When executed by the processor, the computer program implements the steps in the above operating method of a CAWN system. The communication device may be each unit or functional entity in the CAWN system.

An embodiment of the disclosure provides a computer-readable storage medium, in which a computer program is stored. When executed by the processor, the computer program implements the steps in the above operating method of a CAWN system.

It is understandable that these embodiments described here may be implemented by hardware, software, firmware, middleware, microcode, or a combination thereof. For hardware implementation, the processing unit may be realized in one or more of an ASIC, a DSP, a DSP Device (DSPD), a Programmable Logic Device (PLD), an FPGA, a universal processor, a controller, a micro-controller, a microprocessor, other electronic units for implementing the functions of the application or a combination thereof.

For software implementation, the technology described in the specification can be implemented through modules (such as procedures and functions) that perform the functions described in the specification. A software code can be stored in the memory and executed by the processor. The memory can be implemented in or outside the processor.

Each embodiment in the specification is described progressively. Descriptions made in each embodiment focus on differences from the other embodiments. The same or similar parts in each embodiment refer to the other embodiments Those skilled in the art should know that the embodiment of the disclosure may be provided as a method, an apparatus, or a computer program product. Therefore, the embodiment of the disclosure may use form of a pure hardware embodiment, a pure software embodiment, or an embodiment combining software and hardware. Moreover, the embodiment of the disclosure may use form of a computer program product implemented on one or more computer-available storage media (including, but not limited to, a disk memory, a Compact Disc Read-Only Memory (CD-ROM), and an optical memory) including computer-available program codes.

The embodiments of the disclosure are described with reference to flowcharts and/or block diagrams of the method, UE (system) and computer program product according to the embodiments of the disclosure. It should be understood that each flow and/or block in the flowchart and/or block diagram, and the combination of the flow and/or block in the flowchart and/or block diagram can be implemented by the computer program instructions. These computer program instructions may be provided for a universal computer, a dedicated computer, an embedded processor or a processor of other programmable data processing UE to generate a machine, so that a device for realizing a function specified in one flow or multiple flows in the flowcharts and/or one block or multiple blocks in the block diagrams is generated by the instructions executed through the computer or the processor of the other programmable data processing UE.

Alternatively, these computer program instructions may be stored in a computer-readable memory capable of guiding the computer or the other programmable data processing UE to work in a specific manner, so that a product including an instruction device may be generated by the instructions stored in the computer-readable memory, the instruction device realizing the function specified in one flow or multiple flows in the flowcharts and/or one block or multiple blocks in the block diagrams.

Alternatively, these computer program instructions may be loaded onto the computer or the other programmable data processing UE, so that a series of operating steps are executed on the computer or the other programmable data processing UE to generate processing implemented by the computer, and steps for realizing the function specified in one flow or multiple flows in the flowcharts and/or one block or multiple blocks in the block diagrams are provided by the instructions executed on the computer or the other programmable data processing UE.

Although optional embodiments of the embodiments of the disclosure have been described, those skilled in the art, once learning about basic creative concepts, may make other variations and modifications to these embodiments. Therefore, it is intended that the appended claims are explained to include the optional embodiments and all the variations and modifications falling within the scope of the embodiments of the disclosure.

It is also to be noted that relational terms such as first and second herein are used only to distinguish an entity or operation from another entity or operation and does not always require or imply the existence of any practical relation or sequence between these entities or operations. Moreover, terms "include" and "contain" or any other variation thereof is intended to cover nonexclusive inclusions, so that a process, method, object or UE including a series of elements not only includes those elements, but also includes other elements which are not clearly listed, or further includes elements intrinsic to the process, the method, the object or the UE. Without more restrictions, an element defined by statement "including a/an" does not exclude the existence of the same other elements in a process, method, object or UE including the element.

The above is the optional implementation mode of the disclosure. It is to be pointed out that those of ordinary skill in the art may further make a plurality of improvements and embellishments without departing from the principle of the disclosure, and these improvements and embellishments shall fall within the scope of protection of the disclosure.

What is claimed is:

1. An operating method of a Context-Aware Wireless Network (CAWN) system, applied to the CAWN system, the method comprising:
   collecting and processing, through a Central Data Unit (CDU), data of at least one of a High Layer of Network Side (HL), a Transport Network (TN) or a Lower Layer of Network Side (LL), and generating a command for controlling the at least one of the HL, the TN or the LL;
   controlling, through the CDU, the HL to generate a function of the HL according to measurements including user information, cell information and information of a locally running device;
   controlling, through the CDU, the TN to generate a function of the TN according to the measurements including the user information, the cell information and the information of the locally running device; and
   controlling, through the CDU, the LL to generate a function of the LL according to the measurements including the user information, the cell information and the information of the locally running device.

2. The operating method of a CAWN system of claim 1, further comprising:
   reporting, by the HL, an operating state of the HL and user information beared by the HL to the CDU;
   reporting, by the TN, an operating state of the TN and user information beared by the TN to the CDU;
   reporting, by the LL, an operating state of the LL and user information beared by the LL to the CDU;
   determining, according to the received data information, by the CDU, that a service of a user needs to be deployed near an air interface, and sending a command of separately deploying a data plane function to the HL, wherein the command of separately deploying the data plane function to the HL carries a performance calculation result of the CDU for deployment of a data plane function of the service near the air interface;
   after receiving the command of separately deploying the data plane function to the HL, developing, by the HL, a separation scheme of a secondary data plane function, reporting the separation scheme to the CDU, and sending configuration information to the LL;
   configuring, by the LL, according to the received configuration information;
   sending, by the CDU, a bandwidth adjustment command to the TN; and
   after receiving the bandwidth adjustment command, adjusting, by the TN, a transmission bandwidth of the service according to the bandwidth adjustment command.

3. The operating method of a CAWN system of claim 1, further comprising:
   after predicting that a terminal will perform Handover (HO), sending, by the CDU, an HO command to the HL, wherein the HO command carries an HO time and a target LL;
   determining, by the HL, the target LL after receiving the HO command, acknowledging sending and receiving of a data packet that has been sent after receiving a formal HO request from a source LL, establishing a secondary data plane function on the target LL, and starting to send data after the secondary data plane function is established successfully;
   sending, by the CDU, a bandwidth adjustment command to the TN;
   after receiving the bandwidth adjustment command, reallocating, by the TN, a transmission bandwidth used by a source secondary data plane function or a target secondary data plane function according to the bandwidth adjustment command; and
   instructing, by the HL, the source LL to release the secondary data plane function after the secondary data plane function on the target LL is established successfully.

4. A non-transitory computer-readable storage medium, in which a computer program is stored, wherein the computer program, when executed by a processor, implements the steps in the operating method of the CAWN system of claim 1.

5. The non-transitory computer-readable storage medium of claim 4, wherein the method further comprises:
   reporting, by the HL, an operating state of the HL and user information beared by the HL to the CDU;
   reporting, by the TN, an operating state of the TN and user information beared by the TN to the CDU;
   reporting, by the LL, an operating state of the LL and user information beared by the LL to the CDU;
   determining, according to the received data information, by the CDU, that a service of a user needs to be deployed near an air interface, and sending a command of separately deploying a data plane function to the HL, wherein the command of separately deploying the data plane function to the HL carries a performance calculation result of the CDU for the deployment of a data plane function of the service near the air interface;

after receiving the command of separately deploying the data plane function to the HL, developing, by the HL, a separation scheme of a secondary data plane function, reporting the separation scheme to the CDU, and sending configuration information to the LL;

configuring, by the LL, according to the received configuration information;

sending, by the CDU, a bandwidth adjustment command to the TN; and after receiving the bandwidth adjustment command, adjusting, by the TN, a transmission bandwidth of the service according to the bandwidth adjustment command.

6. The non-transitory computer-readable storage medium of claim 4, wherein the method further comprises:

after predicting that a terminal will perform Handover (HO), sending, by the CDU, an HO command to the HL, wherein the HO command carries an HO time and a target LL;

determining, by the HL, the target LL after receiving the HO command, acknowledging sending and receiving of a data packet that has been sent after receiving a formal HO request from a source LL, establishing a secondary data plane function on the target LL, and starting to send data after the secondary data plane function is established successfully;

sending, by the CDU, a bandwidth adjustment command to the TN;

after receiving the bandwidth adjustment command, reallocating, by the TN, a transmission bandwidth used by a source secondary data plane function or a target secondary data plane function according to the bandwidth adjustment command; and instructing, by the HL, the source LL to release the secondary data plane function after the secondary data plane function on the target LL is established successfully.

7. A communication device, comprising: a memory, a processor and a computer program which is stored on the memory and capable of running on the processor, wherein the computer program, when executed by the processor, implements the steps in an operating method of a Context-Aware Wireless Network (CAWN) system, the method comprising:

collecting and processing, through a Central Data Unit (CDU), data of at least one of a High Layer of Network Side (HL), a Transport Network (TN) or a Lower Layer of Network Side (LL), and generating a command for controlling the at least one of the HL, the TN or the LL;

controlling, through the CDU, the HL to generate a function of the HL according to measurements including user information, cell information and information of a locally running device;

controlling, through the CDU, the TN to generate a function of the TN according to the measurements including the user information, the cell information and the information of the locally running device; and controlling, through the CDU, the LL to generate a function of the LL according to the measurements including the user information, the cell information and the information of the locally running device.

8. The communication device of claim 7, wherein the method further comprises:

reporting, by the HL, an operating state of the HL and user information beared by the HL to the CDU;

reporting, by the TN, an operating state of the TN and user information beared by the TN to the CDU;

reporting, by the LL, an operating state of the LL and user information beared by the LL to the CDU;

determining, according to the received data information, by the CDU, that a service of a user needs to be deployed near an air interface, and sending a command of separately deploying a data plane function to the HL, wherein the command of separately deploying the data plane function to the HL carries a performance calculation result of the CDU for deployment of a data plane function of the service near the air interface;

after receiving the command of separately deploying the data plane function to the HL, developing, by the HL, a separation scheme of a secondary data plane function, reporting the separation scheme to the CDU, and sending configuration information to the LL;

configuring, by the LL, according to the received configuration information;

sending, by the CDU, a bandwidth adjustment command to the TN; and after receiving the bandwidth adjustment command, adjusting, by the TN, a transmission bandwidth of the service according to the bandwidth adjustment command.

9. The communication device of claim 7, wherein the method further comprises:

after predicting that a terminal will perform Handover (HO), sending, by the CDU, an HO command to the HL, wherein the HO command carries an HO time and a target LL;

determining, by the HL, the target LL after receiving the HO command, acknowledging sending and receiving of a data packet that has been sent after receiving a formal HO request from a source LL, establishing a secondary data plane function on the target LL, and starting to send data after the secondary data plane function is established successfully;

sending, by the CDU, a bandwidth adjustment command to the TN;

after receiving the bandwidth adjustment command, reallocating, by the TN, a transmission bandwidth used by a source secondary data plane function or a target secondary data plane function according to the bandwidth adjustment command; and instructing, by the HL, the source LL to release the secondary data plane function after the secondary data plane function on the target LL is established successfully.

10. The communication device of claim 7, wherein the method further comprises: controlling, through the CDU, a self-generating and self-consistent capability of the at least one of the HL, the TN or the LL.

11. The communication device of claim 7, wherein the HL comprises a Network Autonomous Control of High Layer (NAC-H) and a Control Plane and User Plane of High Layer (CP-H/UP-H); the NAC-H is configured to generate, under control of the CDU, an autonomous control command for the CP-H/UP-H according to a parameter generated by the CP-H/UP-H.

12. The communication device of claim 7, wherein the TN comprises a transmission network self-consistent control functional entity and a transmission network layer functional entity; the transmission network self-consistent control functional entity is configured to generate, under control of the CDU, a transmission channel supporting data transmission of the HL and the LL according to a parameter generated by the transmission network layer functional entity.

13. The communication device of claim 7, wherein the LL comprises a Network Autonomous Control of Low Layer (NAC-L) and a Control Plane and User Plane of Low Layer (CP-L/UP-L); the NAC-L is configured to complete, under control of the CDU, control and transmission of air interface data according to a parameter generated by the CP-L/UP-L.

14. The communication device of claim 7, wherein the method further comprises:
  collecting, through the CDU, data information of the at least one of the HL, the TN or the LL, calculate the collected data, and performing, through the CDU, at least one of the following operations:
  determining an operating state of a device and a user;
  identifying a service type of the user and generating a QoS guarantee control command for a service;
  identifying a type of an air interface cell, and generating a control command for the cell;
  identifying an operating state of the device; or
  generating a control command for connection and cooperation of the device.

15. The communication device of claim 14, wherein the collected data information comprises at least one of the following:
  measurement information about an operation of each user and device by the at least one of the HL, the TN or the LL;
  information about sending and receiving data at an air interface;
  information about inter-cell HO of the user; or
  power information of the user.

* * * * *